United States Patent [19]

Durvasula

[11] Patent Number: 4,960,950

[45] Date of Patent: Oct. 2, 1990

[54] FORMATION OF NITROPHENYL ETHERS FROM POLYOLS AND NITROANISOLES

[75] Inventor: Visweswara R. Durvasula, Cheshire, Conn.

[73] Assignee: The Dow Chemical Company, Midland, Mich.

[21] Appl. No.: 173,905

[22] Filed: Mar. 28, 1988

[51] Int. Cl.$^5$ .............................................. C07C 41/14
[52] U.S. Cl. .................... 568/587; 558/423; 558/424; 568/44; 568/584; 568/585; 568/586; 568/588
[58] Field of Search ................ 568/44, 568, 584, 585, 568/586, 587, 588; 558/423, 424

[56] References Cited

U.S. PATENT DOCUMENTS

| | | | |
|---|---|---|---|
| 4,222,962 | 9/1980 | Pellegrini, Jr. ..................... | 568/586 |
| 4,537,999 | 8/1985 | Ogawa et al. ...................... | 568/586 |
| 4,700,011 | 10/1987 | Pillsbury ............................ | 568/585 |

OTHER PUBLICATIONS

A. Oliverio, Atti X° congr. intern chem. 3, 258 to 263 (1939) [Chem. Abst. 33, 9302 (1939)].

Ogata, Science (Japan) 17, 236 to 237 (1947) [Chem. Abst. 45, 5123g (1951)].

Ogata et al. J. Chem. Soc. Japan 69, 148 to 151 (1948) [Chem. Abst. 46, 4500c (1952)].

Ogata et al. J. Am. Chem. Soc. 71, 3211 to 3212 (1949).

*Primary Examiner*—Bruce Gray

[57] ABSTRACT

Disclosed is a novel process for effecting an ether interchange reaction by heating together in the presence of a basic catalyst, a nitroaromatic ether or thioether and an organic compound containing at least one hydroxyl or mercapto group. The novelty resides particularly in carrying out the interchange in an inert solvent while sparging the heated reactants thereby to remove at least a portion of solvent along with an evolving alcohol or thiol.

The process is particularly adapted to the capping of organic polyols with nitroaromatic ether groups. The capped products are useful as intermediates for the preparation of high molecular weight polyamines which in turn find utility in various polymer applications.

33 Claims, No Drawings

FORMATION OF NITROPHENYL ETHERS FROM POLYOLS AND NITROANISOLES

FIELD OF THE INVENTION

This invention relates to the preparation of nitroaromatic containing compounds having ether or thioether groups and is more particularly concerned with the preparation of such compounds via an improved ether interchange reaction.

DESCRIPTION OF THE PRIOR ART

Generally speaking, the preparation of aromatic ethers is a troublesome process which leads to the formation of large amounts of undesirable by-products not to mention the consumption and handling of large amounts of strongly basic materials. This is particularly true when the ethers are prepared via the well-known Williamson process wherein alkali phenolates are reacted with halogen bearing compounds or halo-benzenes are reacted with hydroxyl bearing compounds in the presence of strong bases. Additionally, high reaction temperatures are often necessary when preparing such ethers from halo-benzene starting materials. In some cases when the benzene ring is deactivated by having electron donating substituents, prohibitively high temperatures are required. Furthermore, product yields are often quite low, for example well below seventy percent. Accordingly, such aromatic ether preparations are not attractive from any consideration whether it be economics, technical difficulties, or environmental impact.

Ether interchange reactions have been explored as an alternate method for preparing aromatic ethers. However, the prior art is quite sparse in this regard. In fact, the results to date cannot be considered as very encouraging. A. Oliverio, Atti X° congr. intern chim. 3, 258 to 263 (1939) [Chem. Abst. 33, 9302 (1939)] notes in the study of etherification and saponification of nitrophenols that o-, m-, and p-nitrophenol ethers could be trans etherified by boiling the ethers in methanol or ethanol with a small amount of potassium or sodium hydroxide in the presence of some water. Thus the o- and para-nitroanisoles were converted to the corresponding phenetoles. Yields were reported at 72 percent and 90 percent for ortho and para with meta resulting in only a trace of phenetole. When 2-methoxy-4-nitroanisole was boiled for 14 hours in excess ethanol and 10 percent aqueous sodium hydroxide 2-methoxy-4-nitrophenetole formed.

Ogata first in Science (Japan) 17, 236 to 237 (1947) [Chem. Abst. 45. 5123g (1951)], then in the J. Chem. Soc. Japan 69, 148 to 151 (1948) [Chem. Abst. 46, 4500c (1952)], and finally more fully in J. Am. Chem. Soc. 71, 3211 (1949) reported further on ether interchange reactions. Ogata using essentially the same reaction conditions of Oliverio, namely catalytic quantities of caustic and excess alcohol as both reactant and solvent, established that p-nitroanisole while subject to ether interchange with low molecular weight alcohols would not react with polyhydric alcohols and alcohols of $C_3$ to $C_4$. Ogata established the fact that when a second nitro group was present, the aromatic ring was activated sufficiently to allow an exchange to occur. However, even with this added activation the yield of ether interchange between 2,4-dinitroanisole and ethylene glycol was only 69 percent which dropped to 26 percent with glycerine as the polyhydric alcohol.

A facile method for converting hydroxyl or thiol groups to their corresponding nitroaromatic thio (ether) derivatives would provide an economically attractive source for a broad range of intermediates useful in the preparation of monomeric or polymeric products. If the method could be effected at relatively low temperatures and with catalytic rather than stoichiometric proportions of base catalysts, this would provide even further advantages.

A number of poly(nitroaromatic ether) derivatives of polyols and thiols made by conventional methods have been disclosed in copending U.S. application Ser. No. 35,121 filed Apr. 6, 1987.

SUMMARY OF THE INVENTION

This invention is directed to an improved process for effecting an ether interchange reaction by heating together in the presence of a basic catalyst a nitroaromatic ether or thioether having the formula $NO_2ArXR'$ (II) and an organic compound having the formula RXH (III) containing at least one alcohol or thioalcohol group, thereby exchanging the —XR radical of (III) for the —XR' radical of (II) to form $NO_2ArXR$ (I) and evolving R'XH (IV) [see Eq (1) REACTION CHART below] wherein Ar represents an arylene radical, X is selected from the group consisting of —O—, and —S—, R is the residue of an organic compound after removal of the —XH and R' is selected from the group consisting of lower alkyl, cycloalkyl, and aryl, wherein the improvement comprises carrying out said process in an inert organic solvent while sparging said heated reactants with a gas thereby removing from the reaction site at least a portion of said solvent and at least a portion of the evolving R'XH.

A particular embodiment of this invention is directed to the preparation of a nitroaromatic compound having the formula (Ia) [see Eq (2) REACTION CHART below] wherein R is the residue after removal of hydroxyl groups or mercapto groups respectively of a polymeric polyol or polythiol having a molecular weight of from about 400 to about 12,000 and a functionality n of from about 2 to about 8, —X—represents —O— when said R is the residue of a polyol and —S— when said R is the residue of a polythiol, y is 1 or 2, A is selected from the group consisting of hydrogen and an inert substituent, p has a value selected from the group consisting of the value of n, a value falling within the range of 1 to 7 which value is less than that of n, and mixtures thereof, said process comprising heating together in the presence of a basic catalyst and in an inert organic solvent a nitro-aromatic ether or thioether having the formula (IIa) [see REACTION CHART below] and a polymeric polyol or polythiol (IIIa) wherein R, A, y, and n are as defined above, X is defined as above except that in each of (IIa) and (IIIa) X is independently selected from the group consisting of —O— and —S—, and R' in (IIa) is lower alkyl and sparging said heated reactants with a gas thereby removing from the reaction site at least a portion of said solvent and at least a portion of the evolving R'XH (IV).

In respect of the nitroaromatic ether or thioether (II), it should be understood that while only a single nitro group is depicted in the representative formula, the present process contemplates more than one. This is evident in the particular embodiment of the present process described above wherein the nitroaromatic compounds (IIa) are exemplified.

The term "arylene radical" means a divalent arylene containing radical derived from an aromatic hydrocarbon having from 6 to 18 carbon atoms, inclusive, such as phenylene, tolylene, xylylene, naphthylene, diphenylylene, and radicals having the formula

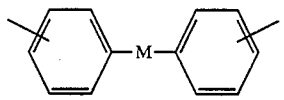

wherein M is selected from the group consisting of —SO₂—, —CO—, —O—, and $C_1$ to $C_4$ alkylene, such as methylene, propylene, butylene, isopropylidene, and the like.

The term "lower alkyl" means alkyl having from 1 to 8 carbon atoms, inclusive, such as methyl, ethyl, propyl, butyl, pentyl, hexyl, heptyl, octyl, and isomeric forms thereof.

The term "cycloalkyl" means moieties having from 4 to 8 carbon atoms, inclusive such as cyclobutyl, cyclopentyl, 2-methylcyclopentyl, cyclohexyl, 4-methylcyclohexyl, cycloheptyl, cyclooctyl, and the like.

The term "aryl" means the radical obtained by removing one nuclear hydrogen atom from an aromatic hydrocarbon having 6 to 12 carbon atoms, inclusive, such as phenyl, tolyl, naphthyl, biphenylyl, and the like.

In respect of the organic compound (III) it is schematically depicted as containing at least one —XH. In its broadest scope the present process contemplates both mono- and polyfunctional —XH compounds. Such polyfunctional compounds are particularly exemplified in (IIIa) above.

The radical R as used herein for organic compounds (III) or (IIIa) means a monovalent organic radical when only one —XH group is present or a polyvalent organic radical when more than one —XH is involved. In the case of monovalent radicals, this would include, but not necessarily be limited to, lower alkyl, cycloalkyl, and aryl all as defined above. In the case of polyvalent radicals, these would include the organic residues remaining after the removal of the hydroxyl or mercapto groups from the parent polyols or polythiols as broadly defined above.

The term "inert substituent" means any radical which does not react with ethers, alcohols, thiols, bases, or otherwise interfere with the present process. Illustrative of inert substituents are hydrocarbyl which means the monovalent radical obtained by removing one hydrogen atom from the parent hydrocarbon having from 1 to 18 carbon atoms alkyl such as methyl, ethyl, propyl, butyl, pentyl, hexyl, octyl, decyl, and the like; alkenyl such as vinyl, allyl, butenyl, pentenyl and the like; aralkyl such as benzyl, phenethyl, and the like: aryl such as phenyl, tolyl, xylyl, and the like: cycloalkyl such as cyclobutyl, cyclopentyl, cyclohexyl, and the like: cycloalkenyl such as cyclopentenyl, cyclohexenyl, and the like: halo, such as chloro, bromo, fluoro, and iodo: cyano and the like. It will be readily understood by one skilled in the art that the definition for arylene above in respect of Ar would already embrace within its broadest scope the alkyl substituents set forth above as inert substituents.

The term "molecular weight" as used herein means number average molecular weight as determined by end-group analysis or other colligative property measurement.

Advantageously, the present ether interchange process provides an alternative method to the Williamson procedure for providing nitroaromatic containing compounds in high yields. Surprisingly, the high yields ar obtained at relatively low temperatures and without the need for resorting to stoichiometric proportions of strong bases. Even more surprising is the fact that, contrary to the teachings of the prior art, the present process does not require the presence of more than one nitro group on the aromatic ring in order to effect the ether interchange in high yield. This discovery in itself is quite unexpected.

The process can be used to provide intermediate nitroaromatic ether compounds which upon reduction, followed by phosgenation, can provide the corresponding isocyanatoaromatic ether compounds used in preparing various types of insecticides and herbicides. In the case of the polynitroaromatic ether compounds these can serve as solubilizing agents in combination with aqueous alkaline flooding media in the recovery of hydrocarbons from subterranean hydrocarbon-bearing formations. Additionally, they find utility after reduction to their amino-aromatic ether derivatives as monomer reactants in the formation of various kinds of polyurethane-polyurea polymers.

DETAILED DESCRIPTION OF THE INVENTION

The chemical process for effecting the ether interchange reactions in accordance with the present invention can be illustrated in its broadest scope by the schematic equation (1) set forth in the REACTION CHART below. Equations (2) and (3) in the same CHART illustrate further and preferred chemical embodiments which can be carried out in accordance with the present invention. As noted previously, the interchange results in the —XR radical of (III) simply replacing the —XR' radical of (II) thereby evolving R'XH (IV). Accordingly the —X— element in (IV), i.e. —O— or —S— will always correspond with the identity of —X— in (II).

The novel features in the present process reside in (i) the use of particular organic solvents for carrying out the interchange: while (ii) sparging the hot reaction mixture with an inert gas: thereby (iii) removing a portion of distillate which includes both solvent and the evolved (IV). The process can be carried out in any convenient reaction vessel including glass, metal, glass lined autoclaves, reaction kettles, and the like provided the vessel is equipped with a means for heating, means for the take-off of distillate, and means for introducing the inert sparging gas beneath the surface of the reacting solution. Preferably, the vessel is equipped with means for stirring or agitating in addition to the agitation caused by the sparging.

The organic solvents employed can be any inert organic solvent. The term "inert" means any solvent that does not react with alcohols, thiols, aromatic nitro groups, strong bases or otherwise interfere with the present process. Preferred as a class of solvents are those falling within the definition of aprotic solvents, i.e. solvents which do not have alcohol or thiol groups. Most preferred are those solvents classified as aprotic non-polar solvents having a boiling point of at least 70° C. Illustrative but non-limiting of the solvents are dipolar aprotic solvents such as N,N-dimethyl acetamide, N,N-diethyl acetamide, acetonitrile, dimethyl sulfoxide, sulfolane (tetramthylene sulfone), N-methylpyrrolidone, hexamethylphosphoramide, and the like: ketones such as methyl ethyl ketone, 2-pentanone, 3-pentanone, and the like: alicyclic hydrocarbons such as cyclohexane, cycloheptane, and the alicyclic hydrocarbons found in petroleum ethers such as 1,1-dimethylcyclopentane, 1,3-dimethylcyclopentane, ethylcyclohexane, 1,2,4-trimethylcyclohexane, and the like: aliphatic hydrocarbons such as hexane, heptane, octane, nonane, decane, 2-methylheptane, 2-ethylheptane, and the like: aromatic hydrocarbons such as benzene, toluene, ortho-, meta-, para-xylenes, chlorobenzene, dichlorobenzene, nitrobenzene, anisole and the like.

A preferred group of solvents comprises the aromatic hydrocarbons set forth above, and, particularly, benzene, toluene, and the xylenes.

The sparging step carries the definition known to those skilled in the art and means to agitate the reaction solution by means of a positive pressure of an inert gas entering the solution through a sparge tube which is beneath the solution surface. The construction of the sparge tube itself is not critical so long as the tube dispenses the gas beneath the surface of the reacting solution. It can take the form of an open-ended tube, a tube having one or a plurality of openings, and wherein the opening(s) can be of any configuration or size so long as the gas can enter the solution without undue back-pressure. The actual type and size of sparge tube will be dictated largely by the volume of reactants. Typical of the sparge tubes would be glass or metallic tubing having an inside diameter falling within the range of from about 1 mm to about 10 mm. A preferred type are those tubes having fritted glass discs or cylinders which break up the issuing gas flow into a plurality of streams into the solution.

The gas which can be employed for the sparging can be any conventional gas known to be useful for such a purpose. Generally speaking, the gas is inert, it does not react with any of the ingredients or otherwise interfere with the process. However, it should be pointed out that in some cases the gas may interact in the solution in a beneficial way which will be discussed below in detail. Illustratively, the gas can be nitrogen, argon, and the like. It must be under a positive pressure but this is in no way limiting. The pressure simply must be high enough to effect the sparging process but not high enough to displace the liquid solution from its containment. Generally speaking, the pressure can be expressed in any terms denoting positive gas flow but is conveniently expressed by cubic centimeters (c.c.). Advantageously, this flow can range from about 10 to about 100 cc per minute, preferably from about 25 to about 75 cc per minute. But these ranges should in no way be construed as limiting because reactor size and configuration will play a role in the actual gas pressure employed. The starting nitroaromatic compounds and the resulting products, by virtue of the aromatic nitro groups are subject to a coupling reaction to form unwanted azoxy/azo side-products. In this connection, it has been found expedient to employ a minor proportion of oxygen gas along with the inert gas. This serves to suppress the side-product formation. To this extent, the sparging gas is not strictly inert to the reaction system but its effect is beneficial. Oxygen can be employed within a range of from about 1 to about 10 volume percent of the inert ga component.

The sparging step accomplishes more than simply agitating the reaction solution. The combination of the heating of the reactants along with the sparging results in the removal from the reaction site of at least a portion of the solvent along with a portion of the evolving (IV) as distillate. The solvent may be heated to its boiling point and the distillate removed as a condensate away from the reaction site by any convenient means such as through a distillation head, a Dean-Stark trap, a reboiling apparatus and the like. The amounts of solvent and (IV) collected will depend on the time, temperature, and rate of sparging carried on. In an advantage to flow from the present process, the solvent need not be heated to its boiling point in order to form overhead distillate. That is to say, the sparging gas acts to sweep the evolving (IV) and solvent as overhead in a co-distillation at a temperature below that of the boiling point of the solvent. The exact temperature at which this occurs will depend not only on solvent temperature but also on the rate of flow of sparge gas and boiling point of (IV).

Generally speaking, the amount or proportion of solvent removed along with the concomitant proportion of (IV) is sufficient to result in at least about 80 percent conversion or interchange as depicted in equations 1 to 3 set forth in the REACTION CHART. In most cases, the amount of (IV) removed in this step is essentially 100 percent of that produced in the overall process. The actual proportion of solvent removed will vary depending on the reaction temperature and its relation to solvent boiling point, the rate of sparging, and time of reaction. Generally speaking, as the solvent distills, it is replaced at such a rate that a sufficient amount is always present at the reaction site to ensure continuation of the distillation. Alternatively, a sufficiently large excess of solvent may be initially employed so that replacement of the distilling solvent is unnecessary. The actual proportions of reactants in the solvent at any given time is in no way critical to the present process. Typically, the solids content of (II) and (III) together can fall within a range of from about 2 to about 90 percent by weight, preferably within the range of from about 10 to about 75 percent with respect to solvent, most preferably, from 25 to 75 percent.

The exact reaction temperature chosen is not particularly critical so long as it is high enough, along with the other factors discussed above, to result in a reasonable rate of interchange. Whether at the solvent boiling point or below, the temperature advantageously falls within the range of from about 50° C. to about 150° C., preferably from about 70° C. to about 100° C. In this connection, one of the preferred solvent limitations is that it have a boiling point of at least 70° C.

A basic catalyst is required for effecting the ether interchange and it can be any strong base known in the art. By strong base is meant a base having a $pK_b$ less than 0. Typical of such bases are the quaternary ammonium hydroxides such as tetramethylammonium hydroxide, tetraethylammonium hydroxide, tetrapropylammonium hydroxide, tetrabutylammonium hydroxide, trimethylbenzylammonium hydroxide, dimethyldibenzylammonium hydroxide, diphenyldibenzylammonium hydroxide, and the like: quaternary ammonium alkoxides such as tetramethylammonium methoxide, tetramethylammonium ethoxide, tetraethylammonium methoxide, tetraethylammonium ethoxide, trimethylbenzylammonium methoxide, trimethylbenzylammonium ethoxide, and the like; alkali metal hydrides such as sodium hydride, potassium hydride, and lithium hydride: alkali metal hydroxides such as lithium hydroxide, sodium hydroxide and potassium hydroxide: and alkali metal alkoxides such as sodium methoxide, potassium methoxide, sodium ethoxide, potassium ethoxide, sodium propoxide, potassium propoxide, sodium butoxide, potassium butoxide, sodium tertiary butoxide, potassium tertiary butoxide, and the like.

A preferred group of catalysts comprises the alkali metal hydroxides and alkali metal alkoxides. Particularly preferred are sodium hydroxide, potassium hydroxide, sodium methoxide, potassium methoxide, sodium ethoxide, potassium ethoxide, and mixtures of these materials.

In regard to the actual concentration of catalyst employed, it is not strictly limited to catalytic amounts but can be employed in equimolar proportions with the alcohol or thioalcohol (III) if desired. However, this is not necessary, and, even if it is employed in equimolar proportions, when (III) actually has a plurality of —XH groups as in a polyol, then it is essentially present in catalytic proportions. One of the advantages derived from the present process is the fact that stoichiometric amounts of base are not required in contrast to the prior art Williamson ether techniques. Advantageously, the catalyst is employed in an amount of from about 2 to about 45 mole percent based on moles of (III), (IIIa), or (IIIb). Preferably, the concentration is from about 15 to about 35 mole percent, and, most preferably from about 25 to about 35 mole percent.

The proportions in which the reactants are brought together can vary widely depending on the type of product desired. Obviously, when all reactants are monofunctional and it is desired to obtain the product in maximum yield, then at least equimolar proportions of reactants would be employed. There is nothing to prevent (II) being present in excess. Alternatively, when polyols or polythiols are the reactants, then products arising from varying numbers of ether interchange reactions can be provided. This leads to products having anywhere from one up to the maximum number n of the —XH groups exchanged with the nitroaromatic ether or thioether residues. Accordingly, a range of products can be obtained wherein the —XH groups can be totally or partially "capped" with nitroaromatic groups, the extent of capping depending primarily on the proportions of reactants initially selected. The proportions of the reactants are conveniently expressed in terms of their equivalents. For the nitroaromatic ethers and thioethers (II), (IIa), or (IIb) having only the one reactive —XR' or —OR' group, this means their equivalent weights are equal to their respective molecular weights. For the alcohols and thioalcohols (III), (IIIa) and (IIIb) their equivalent weights are their molecular weights divided by their respective number of —XH groups, or —OH groups.

Advantageously, the proportions of reactants are such that the ratio of equivalents of said nitroaromatic ether or thioether per equivalent of said alcohol or thiol falls within a range of from about 0.1:1 to greater than unity. That is to say, at greater than unity, the compounds (II), (IIa), or (IIb) can be employed in any desired excess over the equivalents of (III), (IIIa), or (IIIb). The only limit on this excess is dictated by convenience, and economic considerations. Generally speaking, the ratio will fall within a range of from about 0.1:1 to about 3:1, and, preferably from about 0.1:1 to about 2:1.

The progress and thus he completion of the ether interchange reaction can be readily determined using any of the convenient analytic methods for determining the disappearance of reactants or formation of products or evolving by-products. For example, useful methods include thin layer chromatography, gel permeation chromatography, nuclear magnetic resonance, infrared spectroscopy, and the like. Aliquot samples of the reaction solution or collected distillate can be removed periodically and tested for the key component until the process is judged completed. As noted previously, the proportions of solvent and evolved R'XH are removed in sufficient amount to result in at least about 80 percent ether interchange. This removal can be easily coordinated with the aliquot sample testing. For example, the reaction can be considered complete when the R'XH can no longer be detected in the distillate overhead. The actual time required will vary considerably depending on all the factors previously discussed. The percent conversion or interchange is a measure of the total theoretical ether interchange reaction, whereas the percent capping refers to the number of —XH groups reacted in a polyol or polythiol. For example, if a one molar proportion of (IIa) is being reacted with a molar proportion of (IIIa) wherein n is 3, then a 100 percent ether interchange or conversion will result in 33 percent capping. The average molecular species from such an interchange would have two free —XH groups and one nitroaromatic group.

The reaction products are isolated by conventional procedures well known to those skilled in the art. The degree of isolation and particularly purification required will depend, inter alia, on the ratios of reactant equivalents employed, amount of catalyst and type, and the like. Generally speaking, the catalyst is conveniently removed by the addition of a neutralizing acid, such as hydrochloric and removal of the precipitated insoluble inorganic salts. Conveniently, the base is neutralized by adding a small proportion of water to the cooled reaction solution followed by bubbling in carbon dioxide until a pH of 7 to 8 is reached. The solution can be dried by any known method. The use of solid desiccants is preferred because they are simply removed by filtration to complete the drying step. If desired, further purification steps can be applied such as treatment with decolorizers such as finely divided charcoal, or treatment with inorganic salts to remove residual catalyst cations, and the like. Removal of the inert solvent is accomplished by any convenient method. Distillation is the most preferred method either at atmosphere or under reduced pressures. In those cases where excess nitroaromatic reactants (II) to (IIb) are employed, the excess is removed also by distillative methods. Vacuum distillation is preferred due to the potentially high boiling points of these compounds and the viscosity of the reaction mixtures. The final products can be obtained as residual liquids where low molecular weight compounds (I) are the products and can be further purified by distillation methods. Alternatively, when the products are obtained as solids, they can be purified by conventional crystallization procedures. In those reactions of the present process according to schematic equations (2) and (3), particularly wherein the residues R come from high molecular weight polyols, the products are obtained as colored oils or syrups ranging from mobile liquids to highly viscous materials.

In respect of the types of nitroaromatic ethers or thioethers which can be employed in accordance with the present process, these have been broadly defined by formula (II) discussed above. In a particular embodiment noted above the nitroaromatic ethers (IIa) can be used to provide the products of formula (Ia) set forth in equation (2) of the REACTION CHART below. Preferred as a subclass of (IIa) are those compounds wherein —X— is —O—. More preferred are those nitroaromatic ethers wherein y equals 1 with said nitro group being in the ortho or para position relative to the aromatic ether linkage, with A representing hydrogen, and, most preferred, are those wherein R' is methyl or ethyl. This most preferred group is exemplified in formula (IIb) in equation (3) below. Generally speaking, the nitroaromatic ethers are commercially available or else readily prepared by conventional synthetic methods.

Illustrative but non-limiting of the starting ethers are p-nitroanisole, p-nitrophenetole, p-nitrophenoxypropane, p-nitrophenoxybutane, p-nitrophenoxypentane, p-nitrophenoxyhexane, p-nitrophenoxyheptane, p-nitrophenoxyoctane, (4-nitrophenoxy)phenylmethane, p-nitrophenoxycyclopentane, p-nitrophenoxyhexane, p-nitrophenoxybenzene, 2(p-nitrophenoxy)-p-xylene, 2-methyl-4-nitroanisole, 2-ethyl-4-nitroanisole, 2-propyl-4-nitroanisole, 2,6-dimethyl-4-nitroanisole, 3-chloro-4-nitroanisole, o-nitroanisole, o-nitrophenetole, o-nitrophenoxypropane, o-nitrophenoxybutane, o-nitrophenoxypentane, o-nitrophenoxyhexane, o-nitrophenoxyheptane, o-nitrophenoxyoctane, (2-nitrophenoxy)phenylmethane, o-nitrophenoxycyclopentane, o-nitrophenoxycyclohexane, o-nitrophenoxybenzene, 2-(o-nitrophenoxy)-p-xylene, 4-methyl-2-nitroanisole, 4-ethyl-2-nitroanisole, 4-propyl-2-nitroanisole, 4,6-dimethyl-2-nitroanisole, 4-chloro-2-nitroanisole, 1-methoxy-4-nitronaphthalene, 1-ethoxy-4-nitronaphthalene, 1-methoxy-2-nitronaphthalene, 1-ethoxy-2-nitronaphthalene, 3-nitro-4-methoxybiphenyl, 3-nitro-4-ethoxybiphenyl, 3-nitro-4-methoxyacetophenone, 3-nitro-4-methoxydiphenyl sulfone, 3-nitro-4-methoxydiphenyl ether, 1-nitro-2-methoxy-4,4'-diphenylmethane, and the like; p-nitrothioanisole, p-nitrothiophenetole, p-nitrothiophenoxybutane, p-nitrothiophenoxycyclohexane, p-nitrothiophenoxybenzene, o-nitrothioanisole, o-nitrothiophenetole, o-nitrothiophenoxybutane, o-nitrothiophenoxycyclohexane, o-nitrothiophenoxybenzene, and the like: 2,4-dinitroanisole, 2,4-dinitrophenetole, 2,4-dinitrophenoxypropane, 2,4-dinitrophenoxybutane, 2,4-dinitrophenoxypentane, 2,4-dinitrophenoxyhexane, 2,4-dinitrophenoxyheptane, 2,4-dinitrophenoxyoctane, (2,4-dinitrophenoxy)phenylmethane, 2,4-dinitrophenoxycyclopentane, 2,4-dinitrophenoxycyclohexane, 2,4-dinitrophenoxybenzene, 2,4-dinitro-6-methylanisole, 2,4-dinitrothioanisole, 2,4-dinitrothiophenetole, and the like.

A preferred group comprises the para- and ortho-nitroanisole, nitrophenetole, nitrophenoxypropane, and nitrophenoxybutane, and the 2,4- or ortho-para dinitroanisole, dinitrophenetole, dinitrophenoxypropane, and dinitrophenoxybutane. A most preferred group comprises the para-, and ortho-nitro and 2,4-dinitro anisoles and phenetoles.

The alcohols and thioalcohols which can be employed in the present process are any of the known mono- and polyfunctional alcohols and thiols. By way of illustration only, typical of monofunctional compounds are methanol, ethanol, propanol, isopropanol, butanol, isobutanol, pentanol, hexanol, heptanol, octanol, and isomeric alcohols thereof: cyclopentanol, cyclohexanol, cycloheptanol, and the like: phenol, cresol, xylylol, and the like: methyl mercaptan, ethyl mercaptan, propyl mercaptan, butyl mercaptan, pentyl mercaptan, hexyl mercaptan, heptyl mercaptan, octyl mercaptan, cyclopentanethiol, cyclohexanethiol, thiophenol, and the like.

The present process is particularly adapted to the ether interchange of polyols or polythiols as set forth in the particular embodiment described above and schematically set forth in equation (2) below using the compounds of formula (IIIa). In a preferred embodiment of this interchange reaction —X— represents —O—, that is to say (IIIa) is an organic polyol. In an even more preferred embodiment, the polyol has a functionality n of from about 2 to about 6, and a molecular weight of from about 1000 to about 6000. In regard to equation (3) below the preferred polyol (IIIb) is reacted in the present process with nitroaromatic ether (IIb) to provide the interchange product (Ib) wherein R represents the residue of the preferred polyol having 2 to 6 hydroxyl groups, p now has a value selected from the value of n itself, a value falling within the range of 1 to 5 which is less than n, or mixtures of these values. A most preferred polymeric polyol has the functionality n of from about 2 to about 4.

Illustrative, but not limiting, of the classes of polyols and polythiols which can be used are the polyoxyalkylene polyethers, polymercaptans, polyester polyols, polyol adducts derived from ethylene oxide with methylenedianiline and polymethylene polyphenylamine mixtures (in accordance with U.S. Pat. No. 3,499,009): polyols obtained by the Mannich condensation of a phenolic compound with formaldehyde, an alkanolamine, and ethylene oxide (in accordance with U.S. Pat. No. 3,297,597): vinyl reinforced polyether polyols, e.g. polyols obtained by the polymerization of styrene or acrylonitrile in the presence of the polyether: polyacetals prepared from glycols such as diethylene glycol and formaldehyde: polycarbonates, for example those derived from butanediol with diarylcarbonates: polyester amides, the resole polyols (see Prep. Methods of Polymer Chem. by W. R. Sorenson et al., 1961, page 293, Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.): and all the polyols and polythiols disclosed in U.S. Pat. No. 4,574,137 whose disclosure relative thereto is incorporated herein by reference so long as they meet the limitations set forth above.

A preferred group of polyols comprises the polyalkyleneoxy polyols, in particular polymers of ethylene oxide, propylene oxide, butylene oxide, tetrahydrofuran or the poly(tetramethylene glycols), or polyether polyols which contain propylene oxide units alone or in combination with ethylene oxide in any sequence. Polyols of this type are well known and, for the most part, are commercially available. Generally speaking, they are easily prepared by polymerizing the desired alkylene oxide in the presence of a starter such as water, ethylene glycol, propylene glycol, aniline, glycerol, trimethyolpropane, pentaerythritol, methylglucoside, mixtures thereof, and the like.

The meanings of p, n, and n-p in the equations below are consistent with, and governed by, the selected ratio of equivalents of reactants falling within the ranges set forth above. When the number of equivalents p of nitroaromatic ether (IIa) or (IIb) is at least equal to the number of —XH groups n then the factor n-p cancels to zero and all of the —XH groups have been capped by the ether interchange. The same product results when p exceeds n or when the ratio is greater than unity as described above. Alternatively, the value of p can be deficient so that it falls within the range of 1 to 7, but which is less than n. In the preferred embodiment set forth in equation (3) below wherein the polyol has a lower functionality range, the deficiency of p is such that it falls within the range of 1 to 5 which is less than n. Any percentage of capping of the —XH groups less than 100 percent can be accomplished simply by selecting the appropriately deficient number of equivalents p thus leaving unreacted —XH groups according to the factor n-p. It will be readily understood by one skilled in the art that whenever deficient equivalents are employed product mixtures are obtained which are represented by the average molecular species having the formulae (Ia) and (Ib). The moles or equivalents of evolved R'XH (IV) are equal to the number p of starting ether equivalents.

Aside from the advantage of using only catalytic amounts of base catalysts in the present process, one of the major unexpected advantages is the fact that ether interchange occurs in such high yields. These yields easily reach 80 percent and in most cases in excess of 90 percent. These results are even more surprising considering the fact that they include the mononitroaromatic ethers which the prior art found to be unreactive in ether interchange procedures.

The following examples describe the manner and process of making and using the invention and set forth the best mode contemplated by the inventor of carrying out the invention but are not to be construed as limiting.

EXAMPLE 1

A 500 ml four-necked flask equipped with a mechanical stirrer, a distillation head attached to a Friedrich condenser, a thermometer and a fritted glass (extra course) gas inlet tube is charged with 200 g (0.099 mole) of a polypropyleneoxy-polyethyleneoxy diol, having a molecular weight of about 2025 (approximately 11 percent ethyleneoxy content), 45.3 g (0.296 mole) of ortho-nitroanisole, 0.8 g of sodium hydroxide beads (0.02 mole or 20 mole percent based on polyol), and 200 ml toluene. The reaction mixture is heated in an oil bath during stirring and sparging with a gas mixture consisting of 2.5 volume percent oxygen in nitrogen at a gas flow rate of 60 to 70 cc/minute. The reaction mixture is maintained at 85° to 87° C. and the toluene distillate containing evolved methanol is collected through the condenser. Progress of the reaction is monitored by removing aliquot samples periodically and injecting them into a gel permeation chromatograph equipped with an ultraviolet detector (254 nm) to measure the content of nitrophenylether capped polyol. After 3 hours, about 50 ml of distillate is collected and a 50 ml replenishment portion of fresh toluene is added to the reaction mixture. This is followed by a second three hour period and collection of another 50 ml distillate and 50 ml toluene replacement. Maximum product content is shown after seven hours to be about 93 percent capping or 93 percent reaction. Under these conditions it is assumed that the majority of the evolved methanol has been removed.

The reaction mixture is cooled to ambient (about 20° C.) temperature, mixed with 5 ml water and gaseous carbon dioxide is passed into the solution until a pH of about 8.0 is reached. The solution is dried by storage over anhydrous magnesium sulfate. Filtration removes the drying agent to provide a clear filtrate. 5.0 g of magnesium silicate is added to the clear solution which is heated at 70° to 80° C. during gentle stirring for two hours. This serves to absorb sodium ions and filtration removes the insoluble magnesium silicate. Toluene is then removed by heating the solution under about 10 mm of mercury pressure at about 70° C. using a rotovac apparatus. Excess unreacted nitroanisole (about 12.0 g) is then recovered by heating the solvent free residue in a wiped-film evaporator under the conditions of 180° C. and 0.05 to 0.1 mm of mercury pressure.

Thus, there is obtained by a process in accordance with this invention 180 g of orange syrup free of nitroanisole which corresponds to formula (Ib) above wherein the nitro is in the ortho position $n=2$, $p=2$, and R is the residue of the starting poly-propyleneoxy-polyethyleneoxy diol.

Repetition of the above experiment except for cutting the catalyst proportion in half to a 10 mole percent level based on polyol gives rise to the same 93 percent reaction as above. However, at this 10 mole percent level when the above reaction is carried out with the proportions of ortho-nitroanisole reduced to 31.0 g (0.2 mole), the yield of (Ib) is reduced to 82.5 percent.

EXAMPLE 2

Using the same apparatus and procedure outlined in Example 1 above but with the following exceptions there is obtained a nitroaromatic compound by a process in accordance with this invention.

The flask is charged with 200 g (0.0425 mole) of a polypropyleneoxy-polyethyleneoxy triol having a molecular weight of about 4,700, 6.3 g (0.0412 mole) of the ortho-nitroanisole, 1.0 g (0.85 g based on 85 percent content or 0.015 mole) of potassium hydroxide or 35 mole percent based on polyol, and 100 ml of toluene. The reaction temperature is slightly lower than in Example 1 and over about 6.5 hours at 70° to 83° C., two 25 ml portions of collected distillate of toluene/methanol is removed and the reaction solution replenished by two 25 ml portions of toluene. Maximum product content is shown by G.P.C. analysis to be 94.3 percent with 31 percent capping of the triol. Work-up of the reaction mixture according to the procedure of Example 1 except that the wiped-film distillation is not required provides 190 g of reddish orange syrup.

Thus, there is obtained the product which corresponds to formula (Ib) above wherein the nitro group is in the ortho position, $n=3$, $p=1$, and R is the residue of the starting polypropyleneoxy-polyethyleneoxy triol above.

EXAMPLE 3

Using the same apparatus and procedure outlined in Example 1 above but with the following exceptions there is obtained a nitroaromatic compound by a process in accordance with this invention.

The flask is charged with 100 g (0.021 mole) of the same triol described in Example 2, 9.4 g (0.0614 mole) of ortho-nitroanisole, 0.3 g (0.0075 mole) of sodium hydroxide (36 mole percent based on polyol), and 100 ml of toluene. Reaction temperature is 69° to 77° C. and over about 11 hours about 100 ml of distillate/methanol is collected with 100 ml of fresh toluene replenished to the reaction solution. G.P.C. analysis shows 80 percent conversion (80 percent capping). Work-up in the method of Example 1 provides 90 g of reddish orange colored syrup.

Thus, there is obtained the product which corresponds to formula (Ib) above wherein the nitro group is in the ortho position n=3, p=3, and R is the residue of the starting polypropyleneoxy-polyethyleneoxy triol above.

EXAMPLE 4

Using the same apparatus and procedure outlined in Example 1 above but with the following exceptions there is obtained a nitroaromatic compound by a process in accordance with this invention.

The flask is charged with 100 g (0.021 mole) of the same triol described in Example 2, 12.5 g (0.0817 mole) of ortho-nitroanisole, 0.3 g (0.0075 mole) of sodium hydroxide (36 mole percent based on polyol) and 150 ml of toluene. At the same reaction temperature as in Example 3 but over a 9 hour period the 100 ml distillate of toluene/methanol is removed with 100 ml replenishment of fresh toluene. G.P.C. analysis at the end of this period shows greater than 90 percent conversion and capping of the hydroxyls. Work-up by the procedure of Example 1 provides 2.5 g of unreacted nitroanisole by wiped-film distillation at 180° C. (0.05 m of mercury pressure) and 90 g of syrup as product.

Thus, there is obtained the product which corresponds to formula (Ib) above wherein the nitro group is in the ortho position, n=3, p=3, and R is the residue of the starting polypropyleneoxy-polyethyleneoxy triol above.

EXAMPLE 5

Using the same apparatus and procedure outlined in Example 1 above but with the following exceptions there is obtained a nitroaromatic compound by a process in accordance with this invention.

The flask is charged with 200 g (0.0425 mole) of the same triol described in Example 2, 6.3 g (0.041 mole) of para-nitroanisole, 3 g 0.046 mole or about 100 mole percent based on polyol, and 100 ml of toluene. After about 13 hours of heating and sparging at 70° to 77° C., G.P.C. analysis showed 82 percent conversion at 29.7 percent capping. The collected distillate over this period is about 100 ml while the replenishment toluene is 100 ml. Work-up by the procedure previously described provides the viscous liquid product of formula (Ib) above wherein the nitro group is in the para position, n=3, p=1, and R is the residue of the starting polypropyleneoxy-polyethyleneoxy triol above.

EXAMPLE 6

Using the same apparatus and procedure outline in Example 1 above but with the following exceptions there is obtained a nitroaromatic compound by a process in accordance with this invention.

The flask is charged with 200 g (0.1 mole) of a polypropylenoxy diol having a molecular weight of about 2,000, 44.8 g (0.29 mole) of ortho-nitroanisole, 0.8 g (0.02 mole) of sodium hydroxide which is about 20 mole percent based on polyol, and 200 ml of toluene. After about 8 hours at 78° to 88° C., G.P.C. analysis shows 90.6 percent conversion. The collected distillate over this period is 100 ml of toluene/methanol with 100 ml replacement toluene. Work-up by the procedure previously described in Example 1 provides about 12 g of unreacted nitroanisole at 187° C. (0.05 mm of mercury pressure) and 180 g of viscous syrupy product.

Thus, there is obtained the product which corresponds to formula (Ib) above wherein the nitro group is in the ortho position, n=2, p=2, and R is the residue of the starting polypropyleneoxy diol above.

EXAMPLE 7

Using the same apparatus and procedure outlined in Example 1 above but with the following exceptions there is obtained a nitroaromatic compound by a process in accordance with this invention.

The flask is charged with 200 g (0.048 mole) of a polypropyleneoxy-polyethyleneoxy diol having a molecular weight of about 4,000, 22 g (0.144 mole) of ortho-nitroanisole, 0.8 g (0.02 mole) of sodium hydroxide which is about 41 mole percent based on polyol, and 200 ml of toluene. After about 7 hours at 67° to 70° C., G.P.C. analysis shows 93.2 percent conversion or capping. During this period 50 ml of distillate toluene/methanol is collected with 50 ml of replacement toluene added. Work-up by the procedure previously described including removal of unreacted nitroanisole provides 180 g of orange colored syrup as product.

Thus, there is obtained the product which corresponds to formula (Ib) above wherein the nitro group is in the ortho position, n=2, p=2, and R is the residue of the polypropyleneoxy-polyethyleneoxy diol above.

REACTION CHART

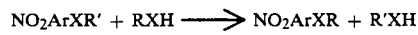
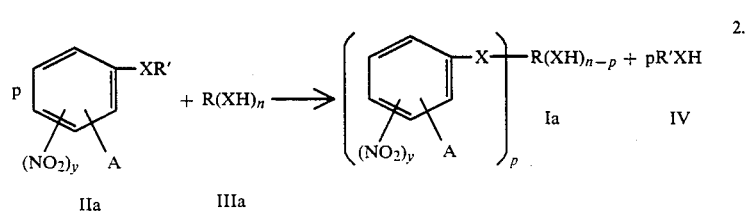

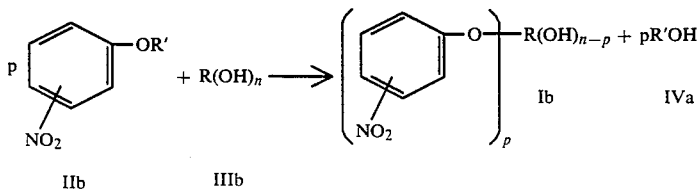

-continued

3.

What is claimed is:

1. In a process for effecting an ether interchange reaction by heating together in the presence of a basic catalyst a nitroaromatic ether or thioether having the formula NO$_2$ArXR' (II) and an organic compound having the formula RXH (III) containing at least one alcohol or thioalcohol group, thereby exchanging the —XR radical of (III) for the —XR' radical of (II) to form NO$_2$ArXR (I) and evolving R'XH (IV), wherein Ar represents an arylene radical, X is selected from the group consisting of —O— and —S—, R is a monovalent residue when only one —XH is present and is removed and is selected from the group consisting of alkyl, cycloalkyl, and aryl or R is a polyvalent residue when more than one —XH is present and removed and is selected from the group consisting of the residues of polymeric polyols when X is —O— and polymeric thiols when X is —S— each having a molecular weight of from about 400 to about 12,000 and functionality of from about 2 to about 8 and R' is selected from the group consisting of lower alkyl, cycloalkyl, and aryl, the improvement which comprises carrying out said process is an inert organic solvent while sparging said heated reactants with a gas thereby removing from the reaction site at least a portion of said solvent and at least a portion of the evolving R'XH sufficient to exchange in at least about 80 percent ether interchange.

2. A process according to claim 1 wherein said heating is at a temperature of from about 50° C. to about 150° C.

3. A process according to claim 1 wherein said basic catalyst is selected from the group consisting of the alkali metal hydroxides and alkali metal alkoxides.

4. A process according to claim 1 wherein said catalyst is employed in an amount of from about 2 to about 45 mole percent based on moles of RXH.

5. A process according to claim 1 wherein said solvent is an aprotic non-polar solvent having a boiling point of at least 70° C.

6. A process according to claim 1 wherein said sparging gas comprises nitrogen.

7. A process according to claim 1 wherein the ratio of equivalents of said nitroaromatic ether or thioether (II) per equivalent of said RXH (III) falls within a range of from about 0.1:1 to greater than unity.

8. A process according to claim 1 wherein said (II) is a nitroaromatic ether compound wherein X is —O—.

9. A process according to claim 1 wherein R' in said (II) is lower alkyl.

10. A process according to claim 1 wherein said nitroaromatic ether or thioether (II) has the formula

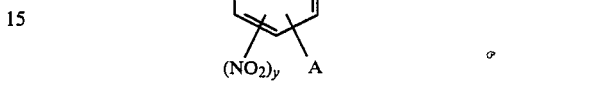

IIa wherein X is selected from the group consisting of —O— and —S—, R' is lower alkyl, A is selected from the group consisting of hydrogen and an inert substituent selected from the group consisting of hydrocarbyl having 1 to 18 carbon atoms, halogen, and cyano, and y is 1 or 2.

11. A process according to claim 1 wherein said compound (III) is a polymeric polyol or polythiol of molecular weight from about 400 to about 12,000 and having the formula R(XH)$_n$     (IIIa)

wherein R is the residue after removal of n hydroxyl groups when X is —O— or n mercapto groups when X is —S—, and n has a value of from about 2 to about 8.

12. A process for the preparation of a nitroaromatic containing compound having the formula

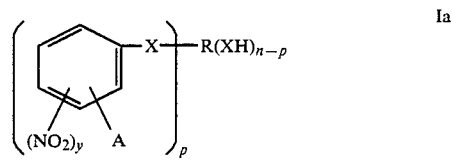

Ia wherein R is the residue after removal of hydroxyl groups or mercapto groups respectively of a polymeric polyol or polythiol having a molecular weight of from about 400 to about 12,000 and a functionality n of from about 2 to about 8, —X— represents —O— when said R is the residue of a polyol and —S— when said R is the residue of a polythiol, y is 1 or 2, A is selected from the group consisting of hydrogen and an inert substituent selected from the group consisting of hydrocarbyl having 1 to 18 carbon atoms, halogen, and cyano, p has a value selected from the group consisting of the value of n, a value falling within the range of 1 to 7 which value is less than that of n, and mixtures thereof, said process comprising heating together in the presence of a basic catalyst and in an inert organic solvent a nitroaromatic ether or thioether having the formula

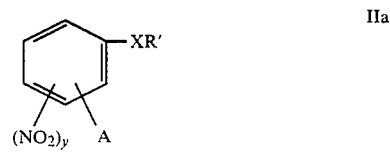

IIa and a polymeric polyol or polythiol (IIIa) having the formula R(XH)$_n$ wherein R, A, y, and n are as defined above, X is defined as above except that in each of (IIa) and (IIIa) X is independently selected from the group consisting of —O— and —S—, and R' is lower alkyl and sparging said heated reactants with a gas thereby removing from the reaction site at least a portion of said solvent and at least a portion of the evolving R'XH sufficient to result in at least about 80 percent ether interchange.

13. A process according to claim 12 wherein said heating is carried out at a temperature of from about 50° C. to about 150° C.

14. A process according to claim 12 wherein said basic catalyst is selected from the group consisting of the alkali metal hydroxides and alkali metal alkoxides.

15. A process according to claim 14 wherein said catalyst is employed in an amount of from about 2 to about 45 mole percent based on moles of (IIIa).

16. A process according to claim 12 wherein said inert organic solvent is an aprotic non-polar solvent having a boiling point of at least 70° C.

17. A process according to claim 16 wherein said solvent is an aromatic hydrocarbon.

18. A process according to claim 12 wherein said sparging gas comprises nitrogen.

19. A process according to claim 12 wherein the ratio of equivalents of said ether (IIa) per equivalent of said (IIIa) falls within a range of from about 0.1:1 to greater than unity.

20. A process according to claim 12 wherein said (IIa) is a nitroaromatic ether wherein X is —O—.

21. A process according to claim 20 wherein in said (IIa) and thus in (Ia), y equals 1 and said nitro group is in the ortho or para position relative to the aromatic ether linkage, and A is hydrogen.

22. A process according to claim 21 wherein R' in said (IIa) is selected from the group consisting of methyl and ethyl.

23. A process according to claim 12 wherein X in said (IIIa) and thus in (Ia) is —O—.

24. A process for the preparation of a nitroaromatic containing compound having the formula

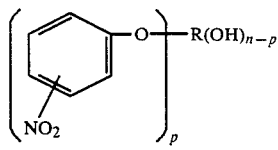

Ib wherein R is the residue after removal of hydroxyl groups of a polymeric polyol having a molecular weight of from about 1000 to about 6000 and a functionality n of from about 2 to about 6, and p has a value selected from the group consisting of the value of n, a value falling within the range of 1 to 5 which value is less than that of n, and mixtures thereof said process comprising heating together at a temperature of from about 50° C. to about 150° C. in an aromatic hydrocarbon solvent and in the presence of a basic catalyst selected from the group consisting of sodium hydroxide, potassium hydroxide, sodium methoxide, potassium methoxide, sodium ethoxide, potassium ethoxide, and mixtures thereof, a nitroaromatic ether having the formula

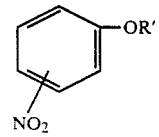

IIb and a polymeric polyol (IIIb) having the formula R(OH)$_n$ wherein R' represents methyl or ethyl and said nitro group is in the ortho or para position relative to the aromatic ether linkage and R and n are as defined above and sparging said heated reactants with nitrogen thereby removing from the reaction site a sufficient proportion of said solvent and evolving R'OH to result in at least 80 percent conversion and wherein the ratio of equivalents of said (IIb) to said polyol (IIIb) falls within a range of from about 0.1:1 to greater than unity.

25. A process according to claim 24 wherein said nitroaromatic ether (IIb) is ortho-nitroanisole.

26. A process according to claim 25 wherein said polyol (IIIb) is a polypropyleneoxy-polyethyleneoxy triol having a molecular weight of about 4,700.

27. A process according to claim 26 wherein the ratio of equivalents of said (IIb) to polyol (IIIb) is about 0.33:1, and, accordingly, in said product (Ib) n=3, and p=1.

28. A process according to claim 26 wherein the ratio of equivalents of said (IIb) to polyol (IIIb) is about 1:1, and, accordingly, in said product (Ib) n=3, and p=3.

29. A process according to claim 26 wherein the ratio of equivalents of said (IIb) to polyol (IIIb) is greater than one, and, accordingly, in said product (Ib) n=3, and p=3.

30. A process according to claim 25 wherein said polyol (IIIb) is a polypropyleneoxy-polyethyleneoxy diol having a molecular weight of about 2,000, the ratio of equivalents of said (IIb) to polyol (IIIb) is greater than one, and, accordingly in said product (Ib) n=2, and p=2.

31. A process according to claim 25 wherein said polyol (IIIb) is a polypropyleneoxy diol having a molecular weight of about 2,000, the ratio of equivalents of said (IIb) to polyol (IIIb) is greater than one, and, accordingly, in said product (Ib) n=2, and p=2.

32. A process according to claim 25 wherein said polyol (IIIb) is a polypropyleneoxy-polyethyleneoxy diol having a molecular weight of about 4,000, the ratio of equivalents of said (IIb) to polyol (IIIb) is greater than one, and, accordingly, in said product (Ib) n=2, and p=2.

33. A process according to claim 24 wherein said nitroaromatic ether (IIb) is para-nitroanisole, said polyol (IIIb) is a polypropyleneoxy-polyethyleneoxy triol having a molecular weight of about 4,700, the ratio of equivalents of (IIb) to (IIIb) is about 0.33 1, and, accordingly, in said product (Ib) n=3, and p=1.

* * * * *